US012327033B1

(12) United States Patent
Kragel et al.

(10) Patent No.: US 12,327,033 B1
(45) Date of Patent: Jun. 10, 2025

(54) QUALITY OF SERVICE (QOS) OPTIMIZED OPEN BLOCK CLOSURE

(71) Applicant: WESTERN DIGITAL TECHNOLOGIES, INC., San Jose, CA (US)

(72) Inventors: Oleg Kragel, San Jose, CA (US); Ji-Hyun In, Saratoga, CA (US); Aajna Karki, San Jose, CA (US); Xiaoying Li, Fremont, CA (US)

( * ) Notice: Subject to any disclaimer, the term of this patent is extended or adjusted under 35 U.S.C. 154(b) by 31 days.

(21) Appl. No.: 18/533,440

(22) Filed: Dec. 8, 2023

(51) Int. Cl.
*G06F 3/06* (2006.01)

(52) U.S. Cl.
CPC ............ *G06F 3/064* (2013.01); *G06F 3/0607* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | |
|---|---|---|
| 9,652,382 B1 * | 5/2017 | Subramanian ...... G06F 12/0253 |
| 10,048,863 B1 | 8/2018 | Goss |
| 10,133,490 B2 | 11/2018 | Sinclair |
| 10,706,938 B2 | 7/2020 | Cha |
| 11,157,210 B2 | 10/2021 | Lee |
| 11,429,504 B2 | 8/2022 | Sheperek |
| 2018/0314448 A1 * | 11/2018 | Grossman ............... G06F 3/064 |
| 2025/0036484 A1 * | 1/2025 | Daugherty ............ G06F 9/4893 |

* cited by examiner

*Primary Examiner* — Kevin Verbrugge
(74) *Attorney, Agent, or Firm* — Arlene Neal; Neal Blibo LLC

(57) ABSTRACT

A storage device optimizes block closure in a memory device and maintains quality of service provided to a host device. The storage device receives commands from a host device and writes host data to a block in the memory device in a first state. When the storage device has not received a host write command for a host write idle time period, the storage device transitions to a second state, performs background operations at a first rate, and writes data to the block. When the storage device has not received a host read command or a host write command for a complete idle time period, the storage device transitions to a third state based, performs background operations at a second rate, and writes data to the block. The storage device uses the transitions between the states to maintain quality of service provided to the host device.

20 Claims, 8 Drawing Sheets

QUALITY OF SERVICE (QOS) OPTIMIZED OPEN BLOCK CLOSURE

BACKGROUND

A storage device may be communicatively coupled to a host and to non-volatile memory including, for example, a NAND flash memory device on which the storage device may store data received from the host. The NAND flash memory may be divided into partitions which may be further divided into blocks, wherein blocks are the smallest units that can be erased from the NAND flash memory. The NAND flash memory may be configured in various formats, with the formats being defined by the number of bits that may be stored per memory cell. Memory devices storing multiple bits per cell may require blocks to be programmed in full within a relatively short period of time measured, for example, in hours. If the blocks are not programmed in full within the required time period, there may be a risk of the data being unrecoverable. However, the host write data stream may slower than is required to fill up the block in full within a required time period.

A controller on the storage device may process background operations to manage the resources on the storage device. In managing the resources of the storage device, the controller may move data from one location to another on the memory device to optimize how space on the memory device is used and improve efficiency. In processing background operations, the controller may move data to fully program an open block within the required time period. However, the background operations may use the resources on the storage device that would have otherwise been available to process other types of commands sent by the host to the storage device when the host stops issuing write data streams to the storage device.

In some cases, the host may have stopped issuing new commands to the storage device, effectively putting the storage device to idle state. When the storage device is in an idle state, when the storage device is receiving other commands, not including write commands, from the host, or when the storage device is receiving write commands from the host, the controller may have to determine whether, and in what amount, to perform background operations to write to an open block, or whether to discard data on the open block. An optimal decision by the controller would be one that would minimally impact host commands, allowing the storage device to provide high quality of service (QOS) to the host and maintain available consumable resources, such as data accumulation buffers and blocks.

In a current approach, the controller may enter an emergency mode once the time a block is opened exceeds a threshold and the controller may write to the block until it is full. The data written may be valid host data, if it is available in a transient cache (for example, in volatile or non-volatile memory). The controller may also write dummy data to the block if valid host data suitable for writing to the block does not exist in a cache. This approach may impact the QOS observed by the host as emergency writes are likely to congest the data path(s) of the storage device significantly enough to cause degradation of QOS.

In another approach, the controller may discard a block with all its content once it has remained opened beyond the threshold. This approach may be possible if the data in a discarded block is still available in a controller's cache (for example, volatile or non-volatile memory). This approach may cause the controller to use up a program-erase cycle each time the contents of the block are erased and may place the storage device in a resource imbalanced state that may require extra write operations to correct. This approach may therefore effectively increase a write amplification factor, i.e., a value representing the amount of data the controller writes relative to the amount of data written by the host.

SUMMARY

In some implementations, the storage device may optimize block closure and maintain the quality of service provided to a host device by operating in different states based on receipt of host commands. The storage device may close blocks on a memory device within a block close time period. A controller on the storage device may operate in a first state and write host data to the block. Based on the host commands received by the storage device, the controller may also operate in a second state, perform background operations at a first rate, and write data to the block. The controller may further operate in a third state, perform background operations at a second rate, and write data to the block. The controller may use transitions between the states to maintain the quality of service provided to the host device.

In some implementations, a method is provided for optimizing block closure by the storage device and maintaining quality of service provided to the host device. The method includes determining that a block in a memory device is to be closed within a block close time period, receiving commands from the host device, and writing host data to the block in a first state. The method also includes transitioning to a second state when a first host command has not been received for a first idle time period, performing background operations at a first rate, and writing data to the block. The method further includes transitioning to a third state based when the first host command or a second host command has not been received for a second idle time period, performing background operations at a second rate, and writing data to the block.

In some implementations, a method is provided for optimizing block closure by a storage device and maintaining quality of service provided to the host device. The method includes determining that a block in a memory device is to be closed within a block close time period. The method also includes receiving commands from a host device and writing host data to the block in a first state. The method further includes determining that the storage device has not received a host write command for a host write idle time period, transitioning to a second state, performing background operations at a first rate, and writing data to the block. The method further includes determining that the storage device has not received a host read command or a host write command for a complete idle time period, transitioning to a third state based, performing background operations at a second rate, and writing data to the block. The method includes using transitions between the states to maintain quality of service provided to the host device.

Figure 1:
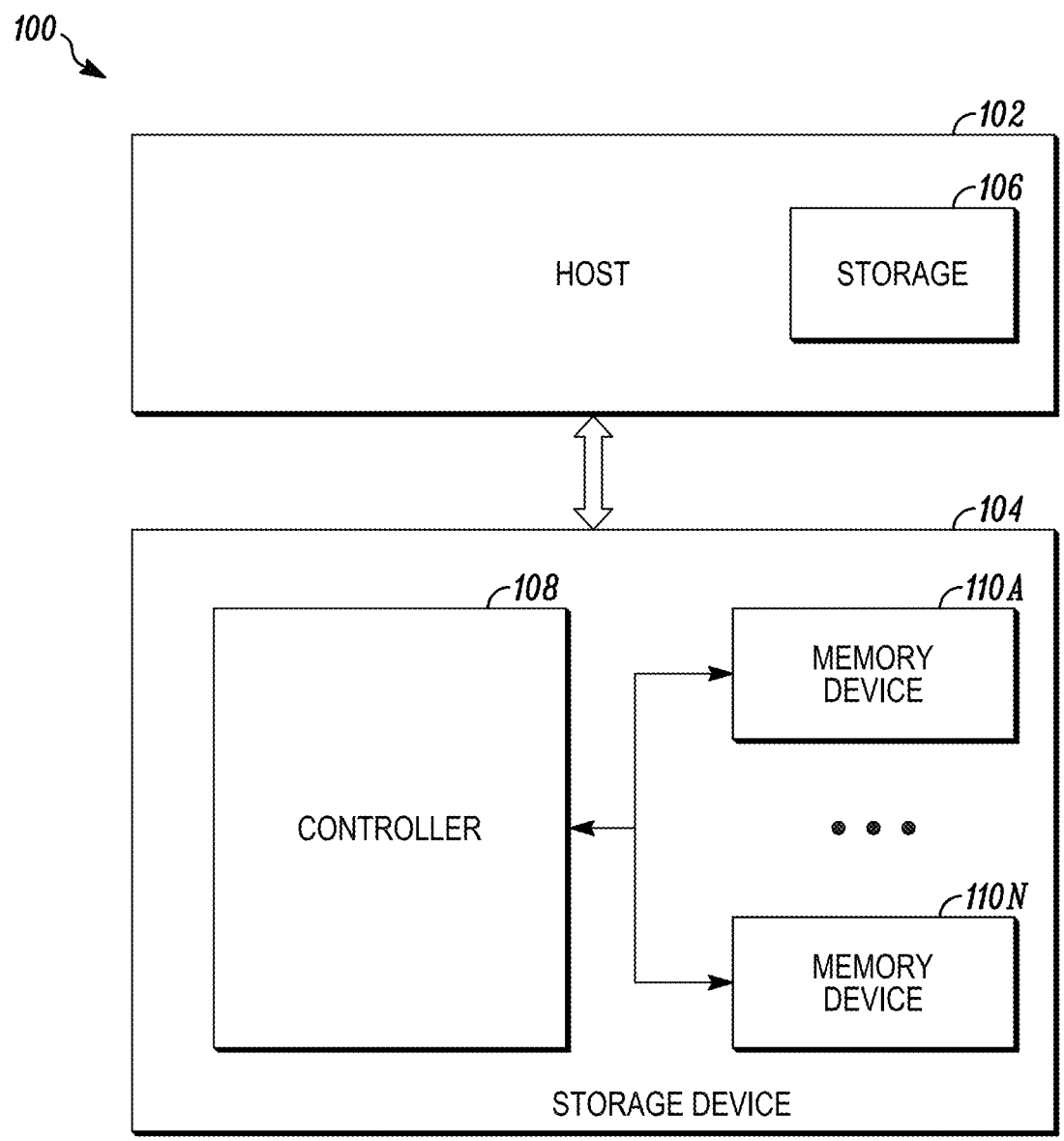
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements FIG. 1 is a schematic block diagram of an example system in accordance with some implementations. System 100 includes a host 102 and a storage device 104. Host 102 may include a storage component 106 and host 102 may transmit commands to read or write data to storage device 104. Host 102 and storage device 104 may be in the same physical location as components on a single computing device or on different computing devices that are communicatively coupled. Storage device 104, in various implementations, may be disposed in one or more different locations relative to the host 102. Host 102 may include additional components (not shown in this figure for the sake of simplicity).

Storage device 104 may include a controller 108 and one or more memory devices 110*a*-110*n* (referred to herein as memory device(s) 110. Controller 108 may process foreground operations to read data from or write data to memory device 110 based on instructions received from host 102. Controller 108 may also process background operations including, for example, executing internal operations to manage the resources on storage device 104 In managing the resources of storage device 104, controller 108 may execute relocation functions including compaction, read scrubbing, wear leveling, garbage collection, and the like, to move data from one location to another on the memory device, optimize how space on the memory device is used, and improve efficiency Memory device 110 may be flash based, including, for example, NAND flash memory. Memory device 110 may be included in storage device 104 or may be otherwise communicatively coupled to storage device 104. Memory device 110 may be divided into blocks and data may be stored in the blocks in various formats, with the formats being defined by the number of bits that may be stored per memory cell. For example, a single-layer cell (SLC) format may write one bit of information per in memory cell, a multi-layer cell (MLC) format may write two bits of information per memory cell, a triple-layer cell (TLC) format may write three bits of information per memory cell, and a quadruple-layer cell (QLC) format may write four bits of information per memory cell, and so on. Formats storing fewer bits in each cell are more easily accessed, durable, and less error-prone than formats storing more bits per cell. However, formats storing fewer bits in each cell are also more expensive.

To ensure the integrity of data stored in a multibit format, controller 108 may fully program a block within a predefined period of time (referred to herein as a block close time period) which may be measured in, for example, hours. To fully program the block within the block close time period, controller 108 may write data associated with write commands received from host 102 to the block. If host 102 does not transmit a write command to storage device 104 for a time period, controller 108 may perform background operations to relocate data on memory device 110 such that a block storing data in a multibit format may be closed within the block close time period.

Typically, during background operations, host 102 may issue commands, including read and/or write command, to storage device 104. If the data paths in storage device 104 become congested due to the background operations, host 102 may experience a lower quality of service (QOS) than it would otherwise receive from storage device 104. To ensure that opened blocks are closed within the block close time period, maintain the QOS provided by storage device 104 to host 102, and ensure that the background operations being performed on storage device 104 do not adversely compete with the host commands and congest the data paths in storage device 104, controller 108 may operate in one or more states at a given time.

When storage device 104 receives a host write command, controller 108 may enter a first state (referred to herein as a host write busy time (HWBT) state). In the HWBT state, controller 108 may write to open blocks as part of processing host write commands. If storage device 104 remains fully in the HWBT state; open blocks may close within the block close time period. When host 102 stops sending host write commands, controller 108 may enter a second state (referred to herein as a host write idle time (HWIT) state. When host 102 stops sending host read and write commands, controller 108 may enter a third state (referred to herein as a complete idle time (CIT) state).

In cases where host 102 stops sending host write commands, controller 108 may a start a host write idle timer which may run for a host write idle time period. If host 102 does not send a host write command during the host write idle time period, after the host write idle time period expires, controller 108 may enter the HWIT state. If after starting the host write idle timer controller 108 receives a host write command during the host write idle time period, controller 108 may remain in its current state. When host 102 stops sending host write command again, controller 108 may reset the host write idle timer to rerun for the host write idle time period.

Consider an example where controller 108 receives a first host write stream and writes the data to block(s) on memory device. If after processing the first host write stream, controller 108 does not receive another host write command, controller may start the host write idle timer to run for the host write idle time period. When the host write idle time period expires, if host 102 still has not sent a write command to storage device 104, controller 108 may leave the HWBT state and enter the HWIT state. If, on the other hand, after starting the host write idle timer controller 108 receives a host write command during the host write idle time period, controller 108 may remain in the HWBT. After controller 108 stops receiving host write commands, controller 108 may reset the host write idle timer to rerun for the host write idle time period.

When host 102 stops sending host read and write commands, controller 108 may a start a complete idle timer which may run for a complete idle time period. If host 102 does not send host read or write commands during the complete idle time period, controller 108 may enter the CIT state. If after starting the complete idle timer controller 108 receives a host read or write command during the complete idle time period, controller 108 may remain in its current state. When controller 108 again stops receiving host read and write commands, controller 108 may reset the complete idle timer to run for the complete idle time period.

As an example, if controller 108 receives a read or write command from host 102 and after processing the read or write command, controller 108 does not receive another host read command and another host write command, controller may start the complete idle timer to run for the complete idle time period. When the complete idle time period expires, if host 102 still has not sent a read or write command to storage device 104, controller 108 may leave the HWBT state or the HWIT state and enter the CIT state. If, on the other hand, after starting the complete idle timer controller 108 receives a host read or write command during the complete idle time period, controller 108 may remain in the HWBT state or the HWIT state. When controller 108 again stops receiving host read and write commands, controller 108 may reset the complete idle timer to rerun for the complete idle time period.

Controller 108 may operate the host write idle timer and the complete idle timer independently. The host write idle time period may also be different from the complete idle time period. Controller 108 may also manage transitions between states separately. For example, controller 108 may manage the transition from the HWBT state to the HWIT state separate from the transition between the HWBT state and the CIT state.

In the HWIT state, controller 108 may execute background operations and write to an open block on a first explicit schedule. The rate in the first explicit schedule (i.e., the volume and frequency at which controller 108 may process background operations and write to open blocks in the HWIT state) may be set according to a HWIT parameter such that the open blocks may be fully written to within the block close time period. In the HWIT state, controller 108 may write to open blocks regardless of whether storage device 104 remains in the HWIT state or re-enters it multiple times as may occur, for example, in the case of a very slow host write command stream.

In the CIT state, controller 108 may write to open block on a second explicit schedule. The rate in the second explicit schedule (i.e., the volume and frequency at which controller 108 may process background operations and write to open blocks in the CIT state) may be set according to a CIT parameter such that the open blocks may be fully written to within the block close time period. In some implementations, the bandwidth allowance for background operations performed in the CIT state may be the same as the bandwidth allowance for background operations performed in the HWIT state. In some implementations, when controller 108 enters the CIT state, controller 108 may activate a higher bandwidth allowance for background operations than that activated in the HWIT state, as such, the rate of write operations performed by controller 108 in the CIT state may be more than the rate of write operations performed in the HWIT state. As controller 108 may enter the CIT state after it has not received a host read command and host write command for the complete idle time period, there may be less implications on the QOS provided to the host when storage device 104 is in the CIT state. As such, when storage device 104 enters the CIT state, host commands may not be impacted by background operations that may cause congestion on internal data path queues in storage device 104.

When storage device 104 receives a read command from host 102 while in the CIT state, controller 108 may deactivate the higher bandwidth allowance for background operations, transition to the HWIT state, and activate a lower bandwidth allowance for background operations. By switching between states, controller 108 may close open blocks within the block close time period and ensure minimal implications on QOS observed by host 102. Switching between states may also enable controller 108 to not increase the write amplification factor of storage device 104.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2A:
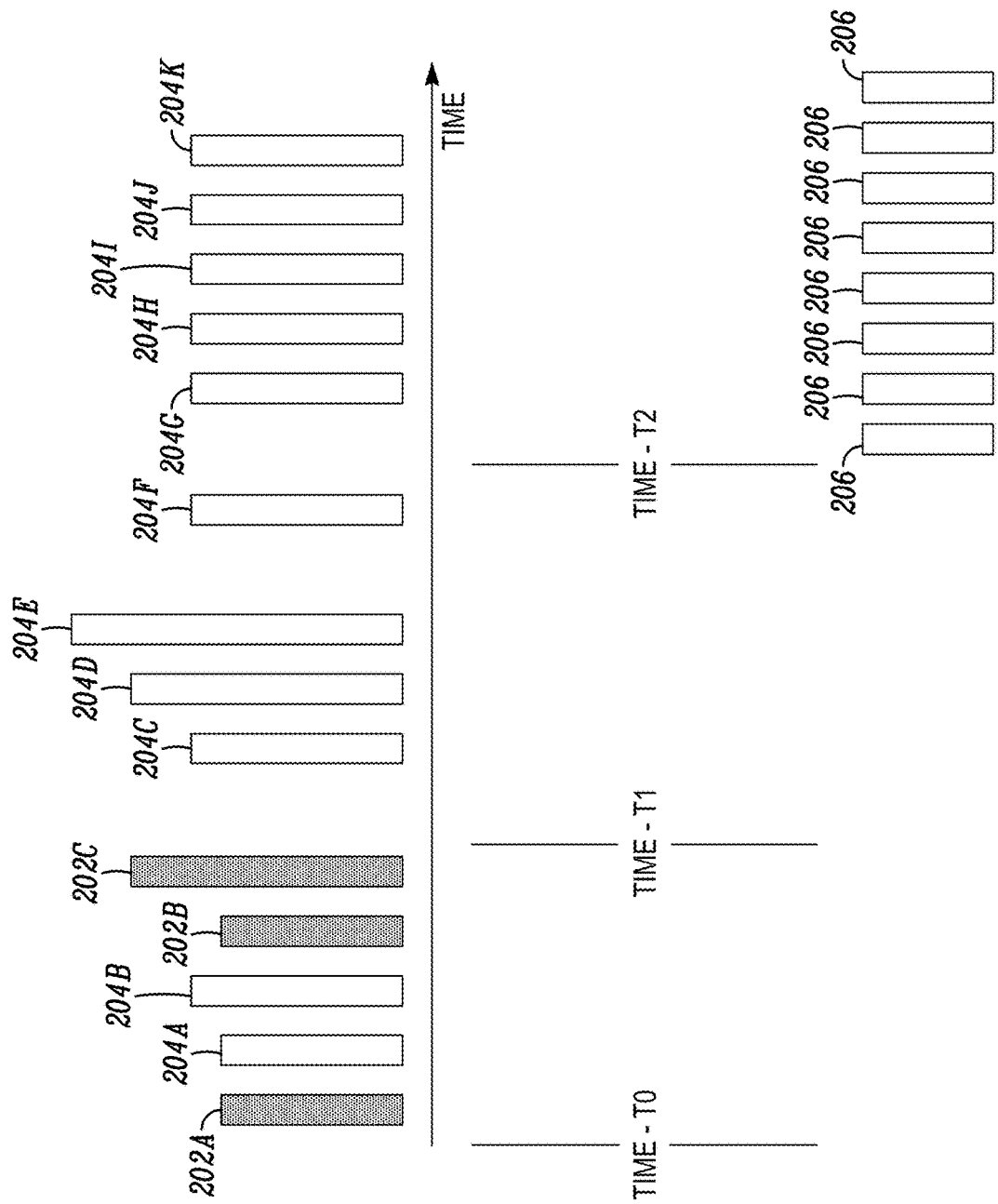
FIGS. 2A and 2B are block diagrams of a time flow showing when a controller switches from a host write busy time state to a host write idle time state in accordance with some implementations.
Figure 2B:
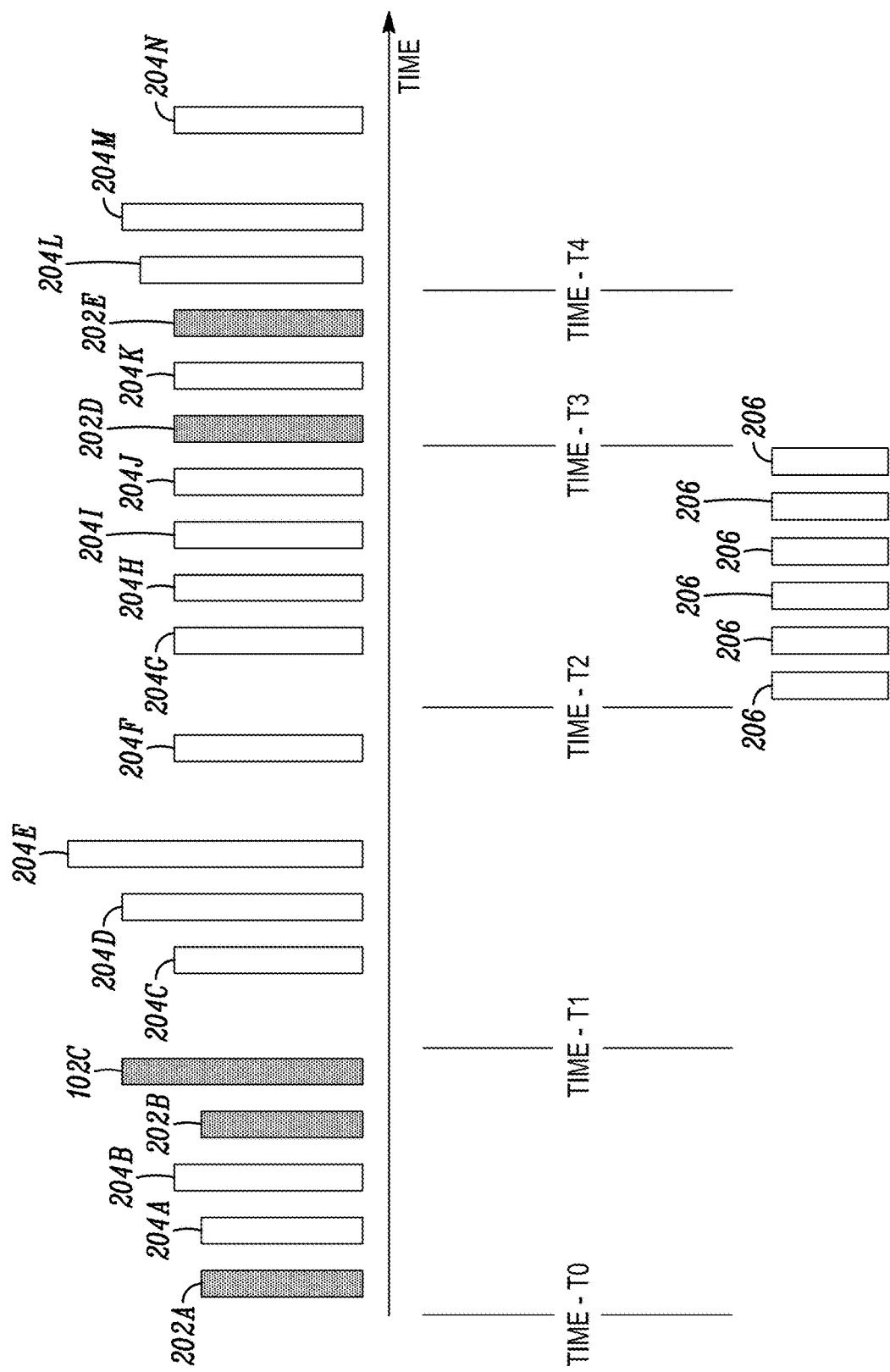

FIGS. 2A and 2B are block diagrams of a time flow when a controller switches from a host write busy time state to a host write idle time state in accordance with some implementations. In FIG. 2A, storage device 104 may receive write commands, shown as blocks 202A-202C and generally referred to as write commands 202, from host 102. Storage device 104 may also receive read commands, shown as blocks 204A-204K and generally referred to as read commands 204, from host 102. At time-T0, as storage device is receiving write commands from host 102, storage device may enter the HWBT state. After storage device 104 receives write command 202C, controller 108 may determine that host is no longer issuing write commands and may start a host write idle timer for a host write idle time period, wherein the host write idle time period may begin at time-T1 and expire at time-T2. Between time-T1 and time-T2, as host 102 continues to send read commands 204 to storage device 104, the host write idle timer may continue to run. After the host write idle time period expires at time-T2, controller 108 may enter a HWIT state and may begin to perform background operations, shown by blocks 206, at a volume and frequency controlled by a HWIT parameter. The HWIT parameter may define the volume and frequency of the background operations such that the background operations may not impact host read commands 204 being received by storage device 104.

In FIG. 2B, storage device 104 may receive write commands, shown as blocks 202A-202E and generally referred to as write commands 202, from host 102. Storage device 104 may also receive read commands, shown as blocks 204A-204N and generally referred to as read commands 204, from host 102. At time-T0, as storage device is receiving write commands from host 102, storage device may enter HWBT state. After storage device 104 receives write command 202C, controller 108 may determine that host is no longer issuing write commands and may start the host write idle timer for a host write idle time period that may begin at time-T1 and expire at time-T2. After the host write idle time period expires at time-T2, controller 108 may enter the HWIT state and may begin to perform background operations, shown by blocks 206, at a volume and frequency controlled by the HWIT parameter. At time-T3 when storage device 104 receives host write command 202D, controller 108 may return to the HWBT state and may use the data in the write command to fill open blocks. At time-T4, when controller 108 determines that host 102 is no longer issuing write command, controller 108 may restart the host write idle timer for a host write idle time period and may enter the HWIT state if the host write idle time period expires (not shown). FIGS. 2A and 2B are provided as examples. Other examples may differ from what is described in FIGS. 2A and 2B.

Figure 3:
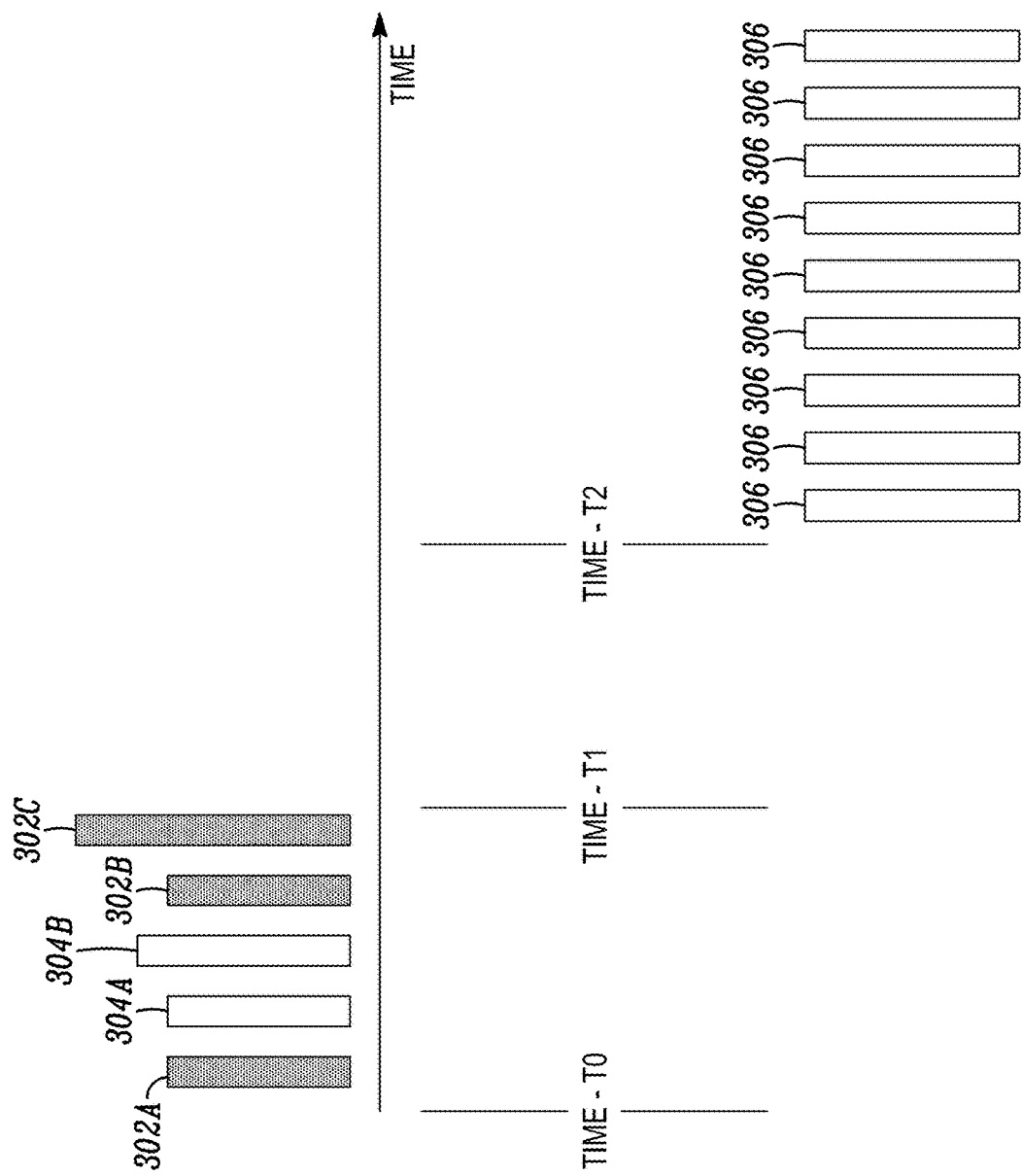
FIG. 3 is a block diagram of a time flow showing when a controller switches from a host write busy time state to a complete idle time state in accordance with some implementations.

FIG. 3 is a block diagram of a time flow when a controller switches from a host write busy time state to a complete idle time state in accordance with some implementations. Storage device 104 may receive write commands, shown as blocks 302A-302C and generally referred to as write commands 302, from host 102. Storage device 104 may also receive read commands, shown as blocks 304A-304B and generally referred to as read commands 304, from host 102. At time-T0, as storage device is receiving write commands from host 102, storage device may enter HWBT state. After storage device 104 receives write command 302C, controller 108 may determine that host is no longer issuing read or write commands and may start a complete idle timer for a complete idle time period, wherein the complete idle time period may begin at time-T1 and expire at time-T2. After the complete idle time period expires at time-T2, controller 108 may enter a CIT state and may begin to perform background operations at a volume and frequency controlled by a CIT parameter. The volume and frequency defined by the CIT parameter may be the same as or more than the volume and frequency defined by the HWIT parameter as the background operation being performed in the CIT state may not affect host commands. As indicated above FIG. 3 is provided as an example. Other examples may differ from what is described in FIG. 3.

Figure 4:
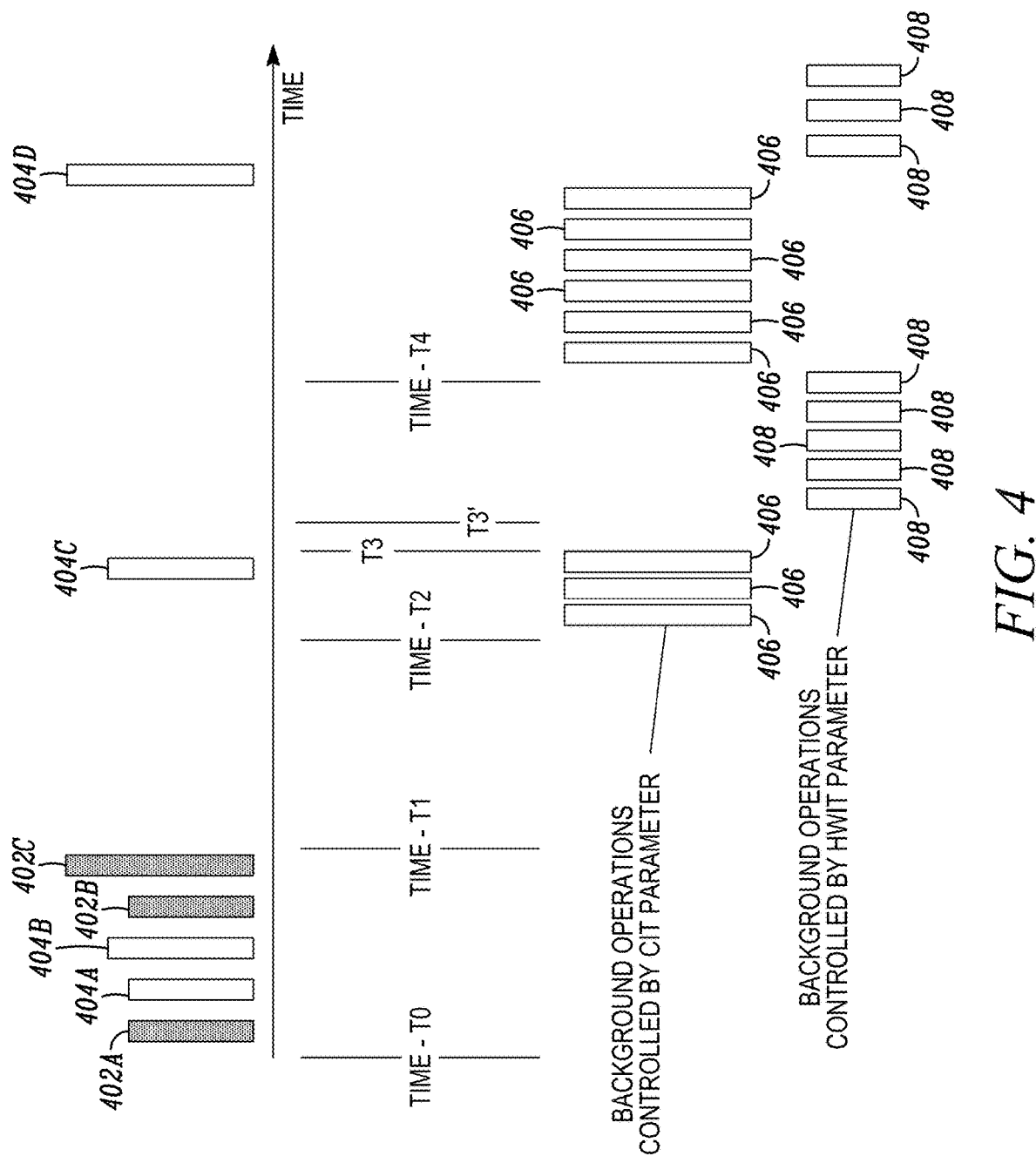
FIG. 4 is a block diagram of a time flow showing when a controller switches from a host write busy time state to a host write idle time state and/or a complete idle time state in accordance with some implementations.

FIG. 4 is a block diagram of a time flow of when a controller switches from a host write busy time state to a host write idle time state and/or a complete idle time state in accordance with some implementations. Storage device 104 may receive write commands, shown as blocks 402A-402C and generally referred to as write commands 402, from host 102. Storage device 104 may also receive read commands, shown as blocks 404A-404D and generally referred to as read commands 404, from host 102. At time-T0, as storage device 104 is receiving write commands from host 102, storage device 104 may enter HWBT state. After storage device 104 receives write command 402C, controller 108 may determine that host 102 is no longer issuing read or write commands and may start a host write idle timer for a host write idle time period and a complete idle timer for a complete idle time period, wherein the host write idle time period may begin at time-T1 and expire at-T3' and the complete idle time period may begin at time-T1 and expire at time-T2.

After the complete idle time period expires at time-T2, controller 108 may enter a CIT state and may begin to perform background operations 406 at a volume and frequency controlled by the CIT parameter. When host 102 transmits read command 404C, controller 108 may leave the CIT state and reset the complete idle timer for the complete idle time period, wherein the complete idle time period may begin at time-T3 and expire at time-T4. At T3' when the host write idle timer expires, controller 108 may enter a HWIT state and may begin to perform background operations 408 at a volume and frequency controlled by the HWIT parameter. At time T4 when controller 108 reenters the CIT state, controller 108 may perform background operations 406 at a volume and frequency controlled by the CIT parameter until storage device 104 receives host read command 404D. Controller 108 may transition to its previous state, i.e., the HWIT state, and then perform background operations 408 at a volume and frequency controlled by the HWIT parameter and may reset the complete idle timer for the complete idle time period. As indicated above FIG. 4 is provided as an example. Other examples may differ from what is described in FIG. 4.

Figure 5:
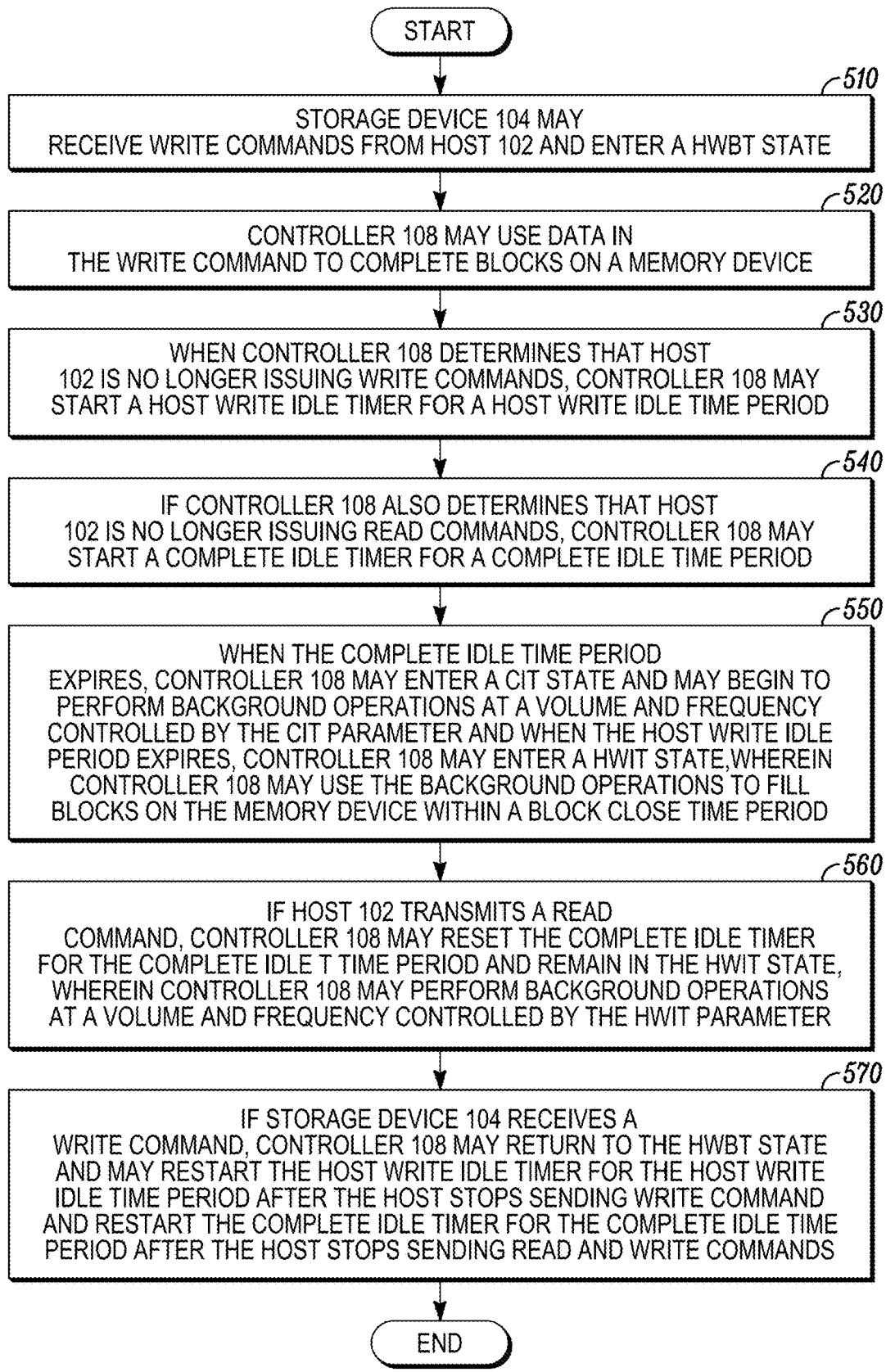
FIG. 5 is a flow diagram of an example process for enabling a storage device to switch from a host write busy time state to a host write idle time state and/or a complete idle time state in accordance with some implementations.

FIG. 5 is a flow diagram of an example process for enabling a storage device to switch from a host write busy time state to a host write idle time state and/or a complete idle time state in accordance with some implementations. At 510, storage device 104 may receive write commands from host 102 and enter a HWBT state. At 520, controller 108 may use data in the write command to complete blocks on a memory device. At 530, when controller 108 determines that host 102 is no longer issuing write commands, controller 108 may start a host write idle timer for a host write idle time period. At 540, if controller 108 also determines that host 102 is no longer issuing read commands, controller 108 may start a complete idle timer for a complete idle time period. At 550, when the complete idle time period expires, controller 108 may enter a CIT state and may begin to perform background operations at a volume and frequency controlled by the CIT parameter and when the host write idle time period expires, controller 108 may enter a HWIT state, wherein controller 108 may use the background operations to fill blocks on the memory device within the block close time period.

At 560, if host 102 transmits a read command, controller 108 may reset the complete idle timer for the complete idle time period and remain in the HWIT state, wherein controller 108 may perform background operations at a volume and frequency controlled by the HWIT parameter. At 570, if storage device 104 receives a write command, controller 108 may return to the HWBT state and may restart the host write idle timer for the host write idle time period after the host stops sending write command and restart the complete idle timer for the complete idle time period after the host stops sending read and write commands. As indicated above FIG. 5 is provided as an example. Other examples may differ from what is described in FIG. 5.

Figure 6:
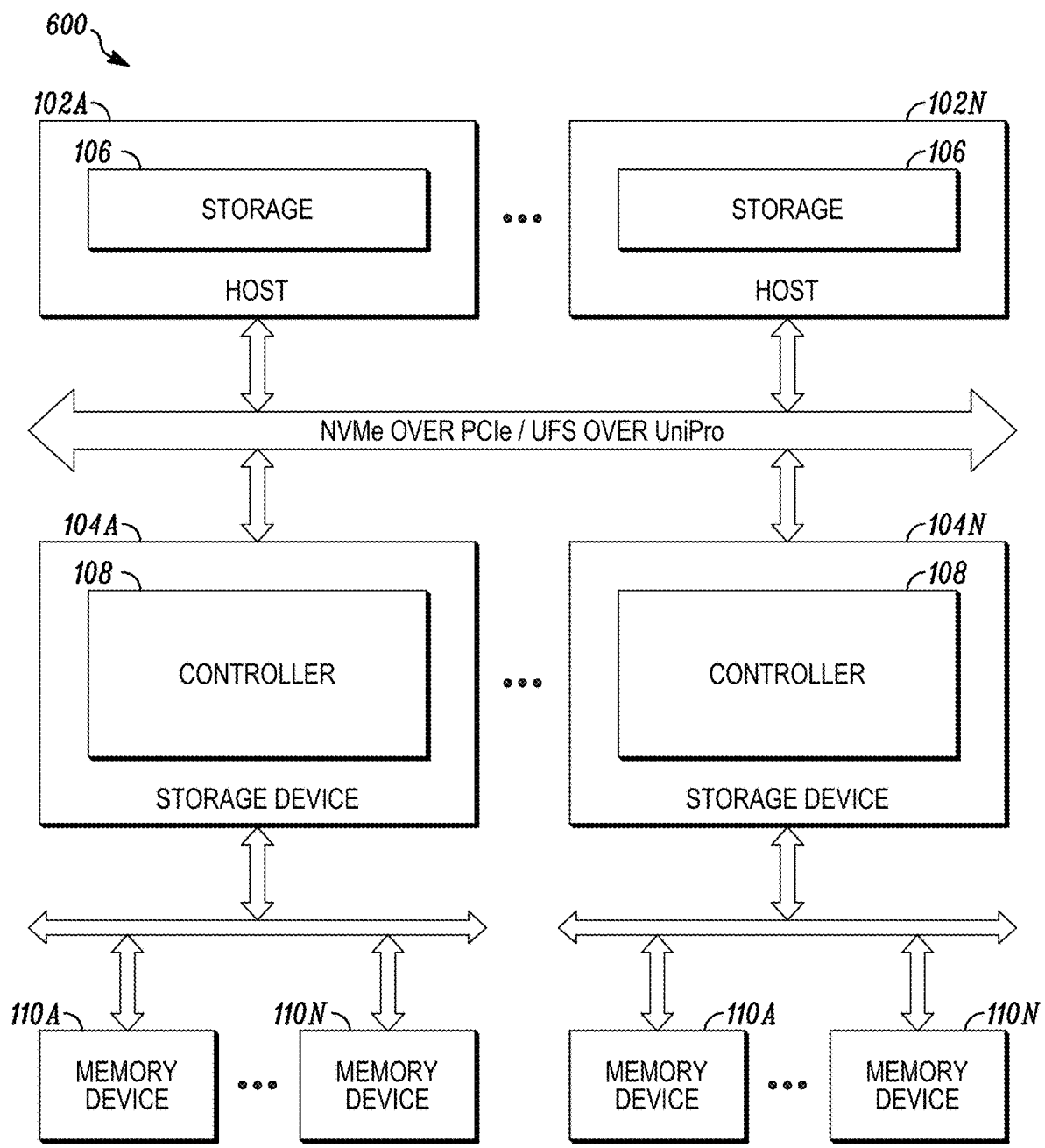
FIG. 6 is a diagram of an example environment in which systems and/or methods described herein are implemented.

FIG. 6 is a diagram of an example environment in which systems and/or methods described herein are implemented. As shown in FIG. 6, Environment 600 may include hosts 102-102*n* (referred to herein as host(s) 102), and storage devices 104*a*-104*n* (referred to herein as storage device(s) 104).

Storage device 104 may include a controller 108 to manage the resources on storage device 104. Controller 108 may switch between states to manage background operations and close memory blocks with the block close time period, while maintaining the QOS provided to host 102. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 600 may interconnect via wired connections, wireless connections, or a combination of wired and wireless connections. For example, the network of FIG. 6 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of Environment 600 may perform one or more functions described as being performed by another set of devices of Environment 600.

Figure 7:
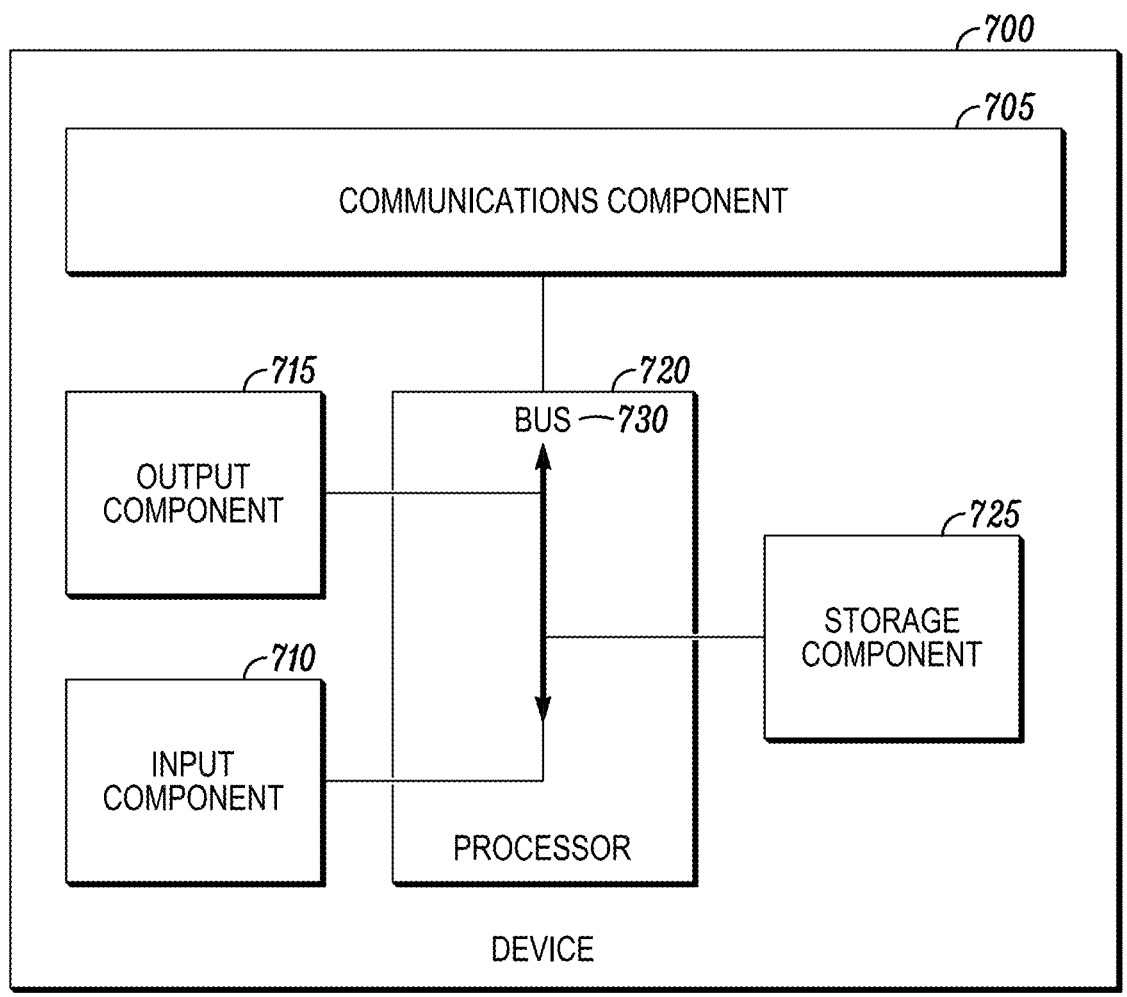
FIG. 7 is a diagram of example components of the host of FIG. 1.

FIG. 7 is a diagram of example components of one or more devices of FIG. 1. In some implementations, host 102 may include one or more devices 700 and/or one or more components of device 700. Device 700 may include, for example, a communications component 705, an input component 710, an output component 715, a processor 720, a storage component 725, and a bus 730. Bus 730 may include components that enable communication among multiple components of device 700, wherein components of device 700 may be coupled to be in communication with other components of device 700 via bus 730.

Input component 710 may include components that permit device 700 to receive information via user input (e.g., keypad, a keyboard, a mouse, a pointing device, a microphone, and/or a display screen), and/or components that permit device 700 to determine the location or other sensor information (e.g., an accelerometer, a gyroscope, an actuator, another type of positional or environmental sensor). Output component 715 may include components that provide output information from device 700 (e.g., a speaker, display screen, and/or the like). Input component 710 and output component 715 may also be coupled to be in communication with processor 720.

Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 may include one or more processors capable of being programmed to perform a function. Processor 720 may be implemented in hardware, firmware, and/or a combination of hardware and software.

Storage component 725 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 720. A memory device may include memory space within a single physical storage device or memory space spread across multiple physical storage devices. Storage component 725 may also store information and/or software related to the operation and use of device 700. For example, storage component 725 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 705 may include a transceiver-like component that enables device 700 to communicate with other devices, such as via a wired connection, a wireless connection, or a combination of wired and wireless connections. The communications component 705 may permit device 700 to receive information from another device and/or provide information to another device. For example, communications component 705 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range.

Communications component 705 may also include one or more broadband and/or narrowband transceivers and/or other similar types of wireless transceiver configurable to communicate via a wireless network for infrastructure communications. Communications component 705 may also include one or more local area network or personal area network transceivers, such as a Wi-Fi transceiver or a Bluetooth transceiver.

Device 700 may perform one or more processes described herein. For example, device 700 may perform these processes based on processor 720 executing software instructions stored by a non-transitory computer-readable medium, such as storage component 725. As used herein, the term "computer-readable medium" refers to a non-transitory memory device. Software instructions may be read into storage component 725 from another computer-readable medium or from another device via communications component 705. When executed, software instructions stored in storage component 725 may cause processor 720 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more" Furthermore, as used herein, the term "set" is intended to include one or more items (e.g, related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to optimize block closure and maintain quality of service provided to a host device, the storage device comprises:
   a memory device including blocks on which data is stored in a multibit format; and
   a controller to operate in different states based on receipt of host commands and to close a block within a block close time period, the controller operates in a first state and writes host data to the block, the controller operates in a second state, performs background operations at a first rate, and writes data to the block, and the controller operates in a third state, performs background operations at a second rate, and writes data to the block, wherein the controller uses transitions between the states to maintain the quality of service provided to the host device.

2. The storage device of claim 1, wherein the controller closes the block within the block close time period when the storage device remains in the first state.

3. The storage device of claim 1, wherein when the controller does not receive a host write command, the controller starts a host write idle timer to run for a host write idle time period and the controller remains in a current state when the controller receives the host write command during the host write idle time period.

4. The storage device of claim 3, wherein the controller enters the second state when the host write idle timer expires.

5. The storage device of claim 1, wherein when the controller stops receiving a host read command and a host write command, the controller starts a complete idle timer to run for a complete idle time period and the controller remains in a current state when the controller receives one of the host read command and the host write command during the complete idle time period.

6. The storage device of claim 5, wherein the controller enters the third state when the complete idle timer expires.

7. The storage device of claim 1, wherein the controller independently operates a host write idle timer and a complete idle timer, wherein the controller uses the host write idle timer to determine whether to switch to the second state and the controller uses the complete idle timer to determine whether to switch to the third state.

8. The storage device of claim 1, wherein the controller manages transitions between the states separately.

9. The storage device of claim 1, wherein the rate of write operations performed in the third state is one of greater than and equal to the rate of write operations performed in the second state.

10. The storage device of claim 1, wherein background operations performed during the third state are allocated one of a higher bandwidth allowance and an equal bandwidth allowance than background operations performed during the second state.

11. The storage device of claim 10, wherein when the storage device receives a read command from the host device while in the third state, the controller deactivates the higher bandwidth allowance for the background operations, transitions to the second state, and activates a lower bandwidth allowance for background operations.

12. A method for optimizing block closure by a storage device and maintaining quality of service provided to a host device, the storage device including a controller to execute the method comprising:

determining that a block in a memory device is to be closed within a block close time period;

receiving commands from a host device and writing host data to the block in a first state;

transitioning to a second state when a first host command, has not been received for a first idle time period, performing background operations at a first rate, and writing data to the block;

transitioning to a third state based on when one of the first host command and a second host command has not been received for a second idle time period, performing background operations at a second rate, and writing data to the block; and using transitions between the states to maintain quality of service provided to the host device.

13. The method of claim 12, wherein when the storage device does not receive a host write command, the method further comprises:

starting a host write idle timer to run for a host write idle time period, entering the second state when the host write idle timer expires, and remaining in a current state when the controller receives the host write command during the host write idle time period.

14. The method of claim 12, wherein when the storage device stops receiving a host read command and a host write command, the method further comprises:

starting a complete idle timer to run for a complete idle time period, entering the third state when the complete idle timer expires; and remaining in a current state when the controller receives one of the host read command and the host write command during the complete idle time period.

15. The method of claim 12, further comprising independently operating a host write idle timer and a complete idle timer, using the host write idle timer to determine whether to switch to the second state, and using the complete idle timer to determine whether to switch to the third state.

16. The method of claim 12, further comprising managing transitions between the states separately.

17. The method of claim 12, further comprising performing one of a higher rate and an equal rate of write operations in the third state than in the second state.

18. The method of claim 12, further comprising allocating one of a higher bandwidth allowance and an equal bandwidth allowance to background operations performed during the third state than to background operations performed during the second state.

19. The method of claim 18, further comprising deactivating the higher bandwidth allowance for the background operations performed during the third state, transitioning to the second state, and activating a lower bandwidth allowance for background operations, when the storage device receives a read command from the host device while in the third state.

20. A method for optimizing block closure by a storage device and maintaining quality of service provided to a host device, the storage device including a controller to execute the method comprising:

determining that a block in a memory device is to be closed within a block close time period;

receiving commands from a host device and writing host data to the block in a first state;

determining that the storage device has not received a host write command for a host write idle time period, transitioning to a second state, performing background operations at a first rate, and writing data to the block;

determining that the storage device has not received one of a host read command and a host write command for a complete idle time period, transitioning to a third state based thereon, performing background operations at a second rate, and writing data to the block; and using transitions between the states to maintain quality of service provided to the host device.

* * * * *